United States Patent
Ikezawa et al.

(10) Patent No.: US 11,420,622 B2
(45) Date of Patent: Aug. 23, 2022

(54) DRIVING ASSISTANCE APPARATUS

(71) Applicant: Toyota Jidosha Kabushiki Kaisha, Toyota (JP)

(72) Inventors: Yuta Ikezawa, Susono (JP); Kohei Tochigi, Susono (JP); Masahiko Adachi, Susono (JP); Shogo Ito, Shizuoka-ken (JP); Shuichi Yamaki, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 105 days.

(21) Appl. No.: 16/711,977

(22) Filed: Dec. 12, 2019

(65) Prior Publication Data

US 2020/0189576 A1 Jun. 18, 2020

(30) Foreign Application Priority Data

Dec. 18, 2018 (JP) .............................. JP2018-236744

(51) Int. Cl.
| | |
|---|---|
| *B60W 30/09* | (2012.01) |
| *B60T 8/171* | (2006.01) |
| *B60W 30/095* | (2012.01) |
| *B60W 10/18* | (2012.01) |
| *B60T 7/12* | (2006.01) |

(52) U.S. Cl.
CPC .............. *B60W 30/09* (2013.01); *B60T 7/12* (2013.01); *B60T 8/171* (2013.01); *B60W 10/18* (2013.01); *B60W 30/0953* (2013.01); *B60W 30/0956* (2013.01)

(58) Field of Classification Search
CPC .. B60W 30/09; B60W 10/18; B60W 30/0953; B60W 30/0956; B60T 7/12; B60T 8/171
See application file for complete search history.

(56) References Cited

U.S. PATENT DOCUMENTS

| | | | | |
|---|---|---|---|---|
| 9,523,984 | B1* | 12/2016 | Herbach | G05D 1/0088 |
| 2015/0106007 | A1 | 4/2015 | Matsumura | |
| 2015/0179062 | A1* | 6/2015 | Ralston | G08G 1/0145 |
| | | | | 701/117 |
| 2016/0282874 | A1* | 9/2016 | Kurata | G05D 1/0088 |
| 2017/0090480 | A1* | 3/2017 | Ho | G05D 1/0214 |
| 2017/0120753 | A1* | 5/2017 | Kentley | B60W 10/08 |
| 2017/0221279 | A1* | 8/2017 | Yu | G06F 21/577 |

(Continued)

FOREIGN PATENT DOCUMENTS

| | | |
|---|---|---|
| JP | 2007-230327 A | 9/2007 |
| JP | 2008-265602 A | 11/2008 |

(Continued)

*Primary Examiner* — Hussein Elchanti

(74) *Attorney, Agent, or Firm* — Dinsmore & Shohl LLP

(57) ABSTRACT

A driving assistance apparatus can provide deceleration assistance of decelerating a host vehicle independently of an operation by a driver. The driving assistance apparatus is provided with: a specifier configured to specify a type of a target associated with the deceleration assistance, wherein the target is ahead of the host vehicle on a course thereof and requires the host vehicle to decelerate or stop; and a controller programmed to change an end condition associated with deceleration assistance, in accordance with the specified type.

5 Claims, 2 Drawing Sheets

(56) References Cited

U.S. PATENT DOCUMENTS

| | | | | |
|---|---|---|---|---|
| 2017/0274901 | A1* | 9/2017 | Herbach | B62D 15/025 |
| 2017/0297569 | A1* | 10/2017 | Nilsson | B60W 60/0053 |
| 2018/0088574 | A1* | 3/2018 | Latotzki | G05D 1/0251 |
| 2018/0162387 | A1* | 6/2018 | Sung | B60W 30/09 |
| 2019/0291729 | A1* | 9/2019 | Kamiya | B60T 7/12 |

FOREIGN PATENT DOCUMENTS

| | | |
|---|---|---|
| JP | 2015-077863 A | 4/2015 |
| JP | 2018-131027 A | 8/2018 |

\* cited by examiner

DRIVING ASSISTANCE APPARATUS

CROSS-REFERENCE TO RELATED APPLICATIONS

This application is based upon and claims the benefit of priority of the prior Japanese Patent Application No. 2018-236744, filed on Dec. 18, 2018, the entire contents of which are incorporated herein by reference.

BACKGROUND

1. Technical Field

Embodiments of the present disclosure relate to a driving assistance apparatus, and particularly relate to a driving assistance apparatus configured to provide deceleration assistance.

2. Description of the Related Art

For this type of apparatus, for example, there is proposed an apparatus configured to perform a deceleration control on a host vehicle if it is determined that the host vehicle is in a situation in which it is to be decelerated or to be stopped (refer to Japanese Patent Application Laid Open No. 2018-131027 (Patent Literature 1)).

When a driver decelerates the host vehicle, a deceleration aspect is changed in many cases in accordance with something that requires the host vehicle to decelerate or stop. On the other hand, in a technology/technique described in the Patent Literature 1, the deceleration control is performed in a uniform deceleration aspect, regardless of a target associated with the deceleration control (i.e., something that requires the host vehicle to decelerate or stop). Thus, there is such a technical problem that the deceleration control causes the driver feel discomfort.

SUMMARY

In view of the aforementioned problem, it is therefore an object of embodiments of the present disclosure to provide a driving assistance apparatus configured to perform a deceleration control while preventing a driver's discomfort.

The above object of embodiments of the present disclosure can be achieved by a driving assistance apparatus configured to be able to perform deceleration assistance of decelerating a host vehicle independently of an operation by a driver, the driving assistance apparatus provided with: a specifier configured to specify a type of a target associated with the deceleration assistance, wherein the target is ahead of the host vehicle on a course thereof and requires the host vehicle to decelerate or stop; and a controller programmed to change an end condition associated with deceleration assistance, in accordance with the specified type.

DETAILED DESCRIPTION OF THE EMBODIMENT

A driving assistance apparatus according to an embodiment of the present disclosure will be explained with reference to FIG. 1 to FIG. 3C.

(Configuration)

Figure 1:
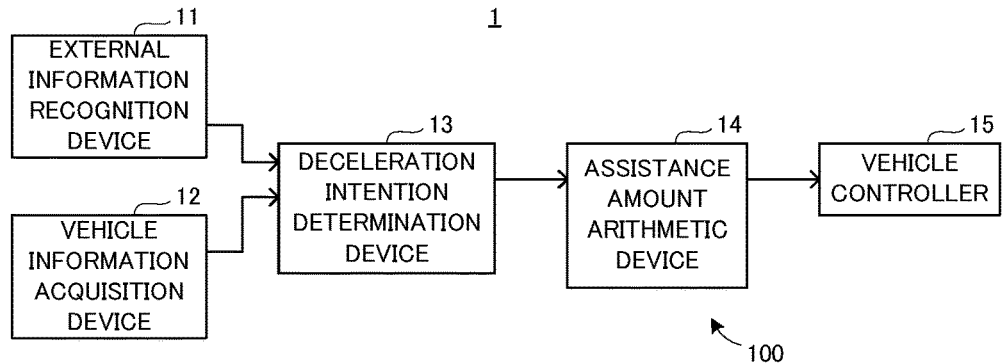
FIG. 1 is a block diagram illustrating a configuration of a driving assistance apparatus according to an embodiment.

A configuration of the driving assistance apparatus according the embodiment will be explained with reference to FIG. 1. FIG. 1 is a block diagram illustrating the configuration of the driving assistance apparatus according to the embodiment.

In FIG. 1, a driving assistance apparatus 100 is mounted on a vehicle 1. The driving assistance apparatus 100 is configured to assist a driver in driving the vehicle 1. The driving assistance apparatus 100 is particularly configured to perform a deceleration assistance control of assisting in decelerating the vehicle 1.

Now, an explanation will be given to conditions that allow the deceleration assistance control to be performed. In the embodiment, the deceleration assistance control may be performed when the following three conditions are satisfied: (i) a deceleration target associated with the deceleration assistance control is recognized, (ii) a distance between the vehicle 1 and the recognized deceleration target is less than or equal to a predetermined distance, and (iii) the driver does not step on any of an accelerator pedal and a brake pedal.

Here, the "deceleration target" is something that requires the vehicle 1 to decelerate or stop. Specifically, an example includes: an obstacle, such as, for example, another vehicle, a pedestrian, and a structure; something that restricts travel of the vehicle 1, such as, for example, a road sign, a red light, and a stop line; and a road structure, such as, for example, an intersection and a curve.

The driving assistance apparatus 100 is provided with an external information recognition device 11, a vehicle information acquisition device 12; a deceleration intention determination device 13, an assistance amount arithmetic device 14, and a vehicle controller 15, so as to realize the deceleration assistance control.

The external information recognition device 11 is configured to recognize a surrounding situation of the vehicle 1 and to obtain surrounding information (or external information) associated with the surrounding situation, on the basis of an output (and also information obtained by road-vehicle communication and vehicle-vehicle communication) from a device configured to detect an external situation of the vehicle 1, such as, for example, a millimeter wave radar, a camera, and light detection and ranging (LiDAR). At this time, if the recognized surrounding situation includes a deceleration target, the external information recognition device 11 may specify a type of the deceleration target. A detailed explanation of a method of recognizing the surrounding situation will be omitted because various existing aspects can be applied thereto.

The vehicle information acquisition device 12 is configured to obtain vehicle information, which indicates a state of the vehicle 1, from an output of a device configured to detect the state of the vehicle 1, such as, for example, a vehicle wheel speed sensor, an accelerator pedal sensor, a brake pedal sensor, and a steering angle sensor. A detailed explanation of a method of obtaining the vehicle information will be omitted because various existing aspects can be applied thereto.

The deceleration intention determination device 13 is configured to determine whether or not the aforementioned three conditions that allow the deceleration assistance control to be performed are satisfied. Particularly, when the driver releases the accelerator pedal or the brake pedal (i.e., when the condition "(iii) the driver does not step on any of the accelerator pedal and the brake pedal" out of the three conditions is satisfied), the deceleration intention determination device 13 is configured to determine whether or not the remaining two conditions are satisfied.

The deceleration intention determination device 13 is configured to determine that the driver's operation of releasing the accelerator pedal or the brake pedal is an intention to decelerate if it is determined that the three conditions are satisfied, and is configured to determine that the driver has a deceleration intention. On the other hand, if it is determined that the three conditions are not satisfied, the deceleration intention determination device 13 is configured to determine that the driver has no deceleration intention.

The deceleration intention determination device 13 may also determine that the driver has a deceleration intention when the driver's line of sight is detected and the driver is considered to gaze at the deceleration target from the detected line of sight, and/or when the driver's brain waves are detected and the detected brain waves correspond to brain waves that are peculiar to deceleration actions, in addition to when the three conditions are satisfied.

The assistance amount arithmetic device 14 is configured to arithmetically operate a deceleration assistance amount associated with the deceleration assistance control (corresponding to deceleration caused by the deceleration assistance control) when the deceleration assistance control is performed. Particularly in the embodiment, the assistance amount arithmetic device 14 is configured to change an end condition of the deceleration assistance control in accordance with the type of the deceleration target. A specific explanation will be given later. A detailed explanation of a method of arithmetically operating the deceleration assistance amount will be omitted because various existing aspects can be applied thereto.

The vehicle controller 15 is programmed or configured to control the vehicle 1 so as to realize target deceleration corresponding to the deceleration assistance amount arithmetically operated by the assistance amount arithmetic device 14. For example, the vehicle controller 15 may control a brake actuator, change an engine output, or perform a regenerative control on a motor.

(Operations)

Next, with reference to a flowchart in FIG. 2, an explanation will be given to operations of the driving assistance apparatus 100.

Figure 2:
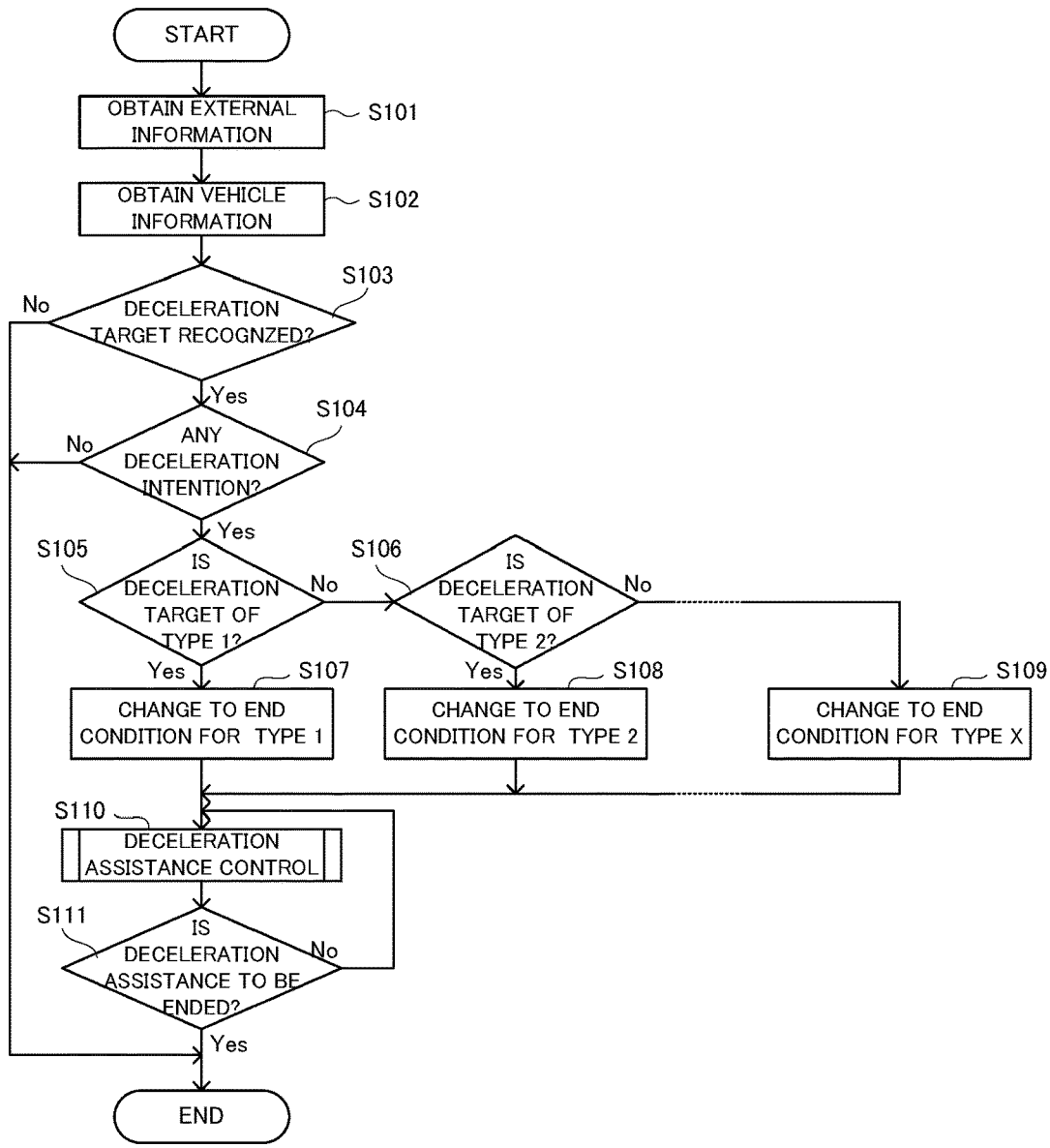
FIG. 2 is a flowchart illustrating operations of the driving assistance apparatus according to the embodiment.

In FIG. 2, the external information recognition device 11 obtains the surrounding information (or external information) (step S101). In parallel with the step S101, the vehicle information acquisition device 12 obtains the vehicle information (step S102).

The deceleration intention determination device 13 determines whether or not the deceleration target is recognized by the external information recognition device 11, on the basis of the surrounding information (step S103). In the step S103, if it is determined that the deceleration target is not recognized (the step S103: No), the operations illustrated in FIG. 2 are temporarily ended. This is because when the deceleration target is not recognized corresponds to when the condition "(i) the deceleration target associated with the deceleration assistance control is recognized", out of the three conditions that allow the deceleration assistance control to be performed, is not satisfied.

Then, after a lapse of a predetermined time (e.g., several ten milliseconds to several hundred milliseconds), the step S101 is performed again. In other words, the operations illustrated in FIG. 2 are repeated with a period corresponding to the predetermined time.

In the step S103, if it is determined that the deceleration target is recognized (the step S103: Yes), the deceleration intention determination device 13 determines whether or not the driver has a deceleration intention (step S104). In the step S104, if it is determined that the driver has no deceleration intention (the step S104: No), the operations illustrated in FIG. 2 are temporarily ended. This is because, as described above, when it is determined that the driver has no deceleration intention corresponds to when the three conditions that allow the deceleration assistance control to be performed are not satisfied.

In the step S104, if it is determined that the driver has a deceleration intention (the step S104: Yes), the assistance amount arithmetic device 14 determines whether or not the type of the deceleration target is a type 1, on the basis of the type of the deceleration target specified by the external information recognition device 11 (step S105). In the step S105, if it is determined that the type of the deceleration target is the type 1 (the step S105: Yes), the assistance amount arithmetic device 14 changes the end condition of the deceleration assistance control to an end condition for the type 1 (step S107).

In the step S105, if it is determined that the type of the deceleration target is not the type 1 (the step S105: No), the assistance amount arithmetic device 14 determines whether or not the type of the deceleration target is a type 2 (step S106). In the step S106, if it is determined that the type of the deceleration target is the type 2 (the step S106: Yes), the assistance amount arithmetic device 14 changes the end condition of the deceleration assistance control to an end condition for the type 2 (step S108).

In the step S106, if it is determined that the type of the deceleration target is not the type 2 (the step S106: No), the same process is repeated until it corresponds to the type of the deceleration target specified by the external information recognition device 11. When it corresponds to the type of the deceleration target specified by the external information recognition device 11, the assistance amount arithmetic device 14 changes the end condition of the deceleration assistance control to an end condition for the corresponding type (which is a "type X" herein) (step S109).

Now, an example of the end condition of the deceleration assistance control will be explained with reference to FIG. 3A to FIG. 3C. An example of the type 1, type 2, . . . , and type X described above includes "something that possibly collides with the vehicle 1", "something that does not collide with the vehicle 1 and requires the vehicle 1 to stop", and "something that does not collide with the vehicle 1 and requires the vehicle 1 to decelerate". The deceleration assistance control shall be started at a position P0 in FIG. 3A to FIG. 3C.

Figure 3A:
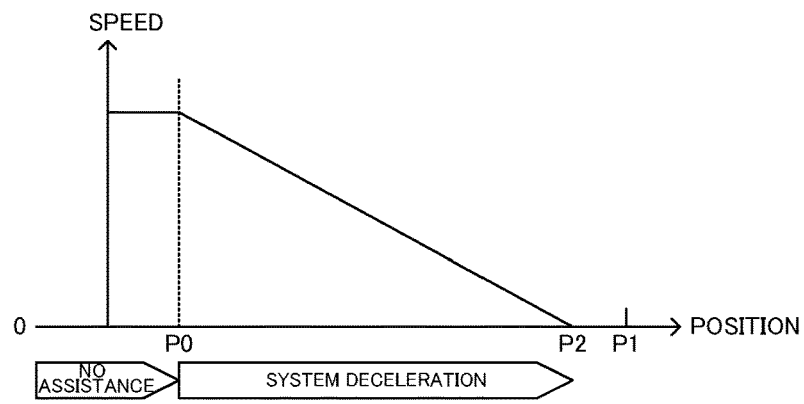
FIG. 3A is a diagram illustrating an example of a deceleration assistance control according to the embodiment.

FIG. 3A illustrates an example of a change in the speed of the vehicle 1 caused by the deceleration assistance control when the type of the deceleration target is "something that possibly collides with the vehicle 1". Here, the deceleration target shall be another vehicle that is stopped at a position P1.

In this case, the assistance amount arithmetic device 14 sets an assistance end position, which is the end condition, to a position P2, and sets an assistance end speed to zero. Here, the assistance end position means a position at which the deceleration assistance control is ended. In this case, the deceleration assistance control is performed until the vehicle 1 completely stops (refer to "SYSTEM DECELERATION" in FIG. 3A).

The position P2 is set in such a manner that a distance between the vehicle 1 and the deceleration target (or another vehicle herein) when the vehicle 1 stops does not cause the driver of the vehicle 1 to fear (e.g., does not cause the driver to worry about a collision between the vehicle 1 and the deceleration target).

Figure 3B:
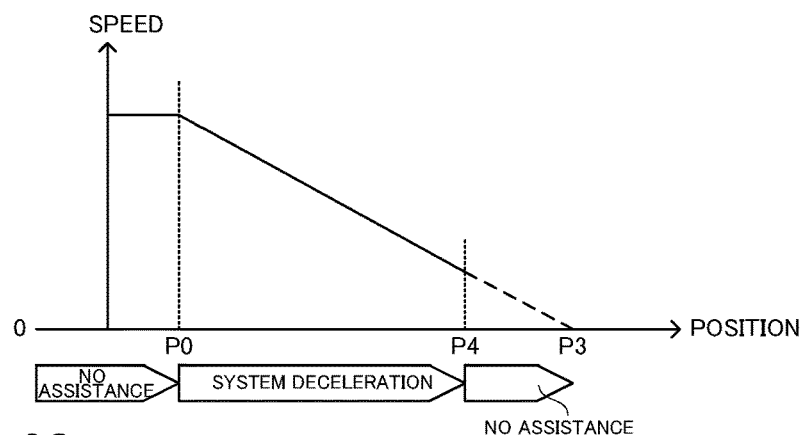
FIG. 3B is a diagram illustrating an example of the deceleration assistance control according to the embodiment.

FIG. 3B illustrates an example of a change in the speed of the vehicle 1 caused by the deceleration assistance control when the type of the deceleration target is "something that does not collide with the vehicle 1 and requires the vehicle 1 to stop". For the deceleration target of this type includes, for example, a stop sign, a red light, and the like are exemplified. A position P3 in FIG. 3B corresponds to a stop position defined by the deceleration target (e.g., a stop line position).

In this case, the assistance amount arithmetic device 14 sets the assistance end position, which is the end condition, to a position P4, and sets the assistance end speed to a value that is greater than zero (but is less than a current speed of the vehicle 1). In this case, the deceleration assistance control is ended before the vehicle 1 completely stops. Therefore, in order to stop the vehicle 1 near the position P3, the driver needs to operate the vehicle 1.

Figure 3C:
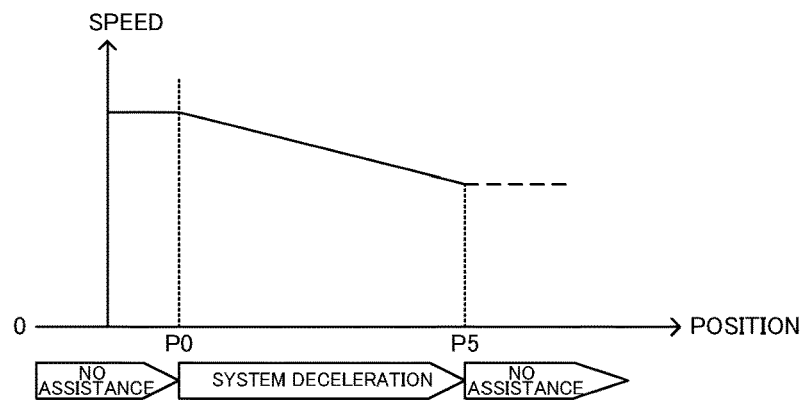
FIG. 3C is a diagram illustrating an example of the deceleration assistance control according to the embodiment.

FIG. 3C illustrates an example of a change in the speed of the vehicle 1 caused by the deceleration assistance control when the type of the deceleration target is "something that does not collide with the vehicle 1 and requires the vehicle 1 to decelerate". For the deceleration target of this type includes, for example, a slow sign, a flashing yellow light, a curve road, and the like are exemplified. A position P5 in FIG. 3C corresponds to, for example, a position near a slow sign, an entrance of an intersection at which a flashing yellow light is placed, an entrance of a curve road, or the like.

In this case, the assistance amount arithmetic device 14 sets the assistance end position, which is the end condition, to the position P5, and sets the assistance end speed to a speed corresponding to the deceleration target. If the deceleration target is a curve road, the speed corresponding to the deceleration target may be set on the basis of, for example, a curvature of the curve road.

Back in FIG. 2, after the end condition is changed in accordance with the type of the deceleration target, the deceleration assistance control is performed (step S110). At this time, the assistance amount arithmetic device 14 arithmetically operates the deceleration assistance amount. The vehicle controller 15 controls the vehicle 1 so as to realize the target deceleration corresponding to the deceleration assistance amount arithmetically operated by the assistance amount arithmetic device 14.

The assistance amount arithmetic device 14 then determines whether or not the deceleration assistance control is to be ended (step S111). In the step S111, if it is determined that the deceleration assistance control is not to be ended (the step S111: No), the deceleration assistance control is continued. On the other hand, in the step S111, if it is determined that the deceleration assistance control is to be ended (the step S111: Yes), the deceleration assistance control is ended, and the operations illustrated in FIG. 2 are ended.

In the step S111, (i) when the end condition of the deceleration assistance control is satisfied, or (ii) when at least one of the three conditions that allow the deceleration assistance control to be performed is no longer satisfied, it is determined that the deceleration assistance control is to be ended.

(Technical Effect)

On the driving assistance apparatus 100, the end condition of the deceleration assistance control is changed in accordance with the type of the deceleration target. Thus, depending on the deceleration target, the deceleration assistance control is performed until the vehicle 1 completely stops, or the deceleration assistance control is ended before the vehicle 1 completely stops. Specifically, for example, when the deceleration target is something that possibly collides with the vehicle 1, the deceleration assistance control is performed until the vehicle 1 completely stops. When the deceleration target is something that does not collide with the vehicle 1, the deceleration assistance control is ended before the vehicle 1 completely stops. In other words, according to the driving assistance apparatus 100, the deceleration assistance control can ensure the avoidance of a collision between the vehicle 1 and the deceleration target when the deceleration target is something that possibly collides with the vehicle 1, whereas the deceleration assistance control allows the driver, for example, to determine a stop position of the vehicle 1 when the deceleration target is something that does not collide with the vehicle 1. Therefore, according to the driving assistance apparatus 100, it is possible to prevent the driver from feeling discomfort due to the deceleration assistance control.

Modified Example

When the deceleration target is something that does not collide with the vehicle 1, the assistance amount arithmetic device 14 may set the end condition of the deceleration assistance control, in accordance with a road surface condition of a road on which the vehicle 1 travels, in addition to the type of the deceleration target. Here, the "road surface condition" may conceptually include not only a condition that may influence a coefficient of friction of a road surface, such as, for example, a degree of unevenness of the road surface, a degree of wetting of the road surface, the presence/absence of an icy road condition, and the presence/absence of snow coverage, but also a road grade or the like.

Specifically, for example, when the deceleration target is something that does not collide with the vehicle 1 (wherein the deceleration target is typically something that requires the vehicle 1 to stop) and when the road surface has a low coefficient of friction, the assistance amount arithmetic device 14 sets (or changes) the end condition of the deceleration assistance control so as to increase a distance from the assistance end position to the deceleration target (or so that the assistance end position approaches a current position of the vehicle 1 (e.g., a position of the vehicle 1 when the deceleration assistance control is started)), and/or so as to reduce the assistance end speed, in comparison with when the road surface has a high coefficient of friction.

For example, when the deceleration target is something that does not collide with the vehicle 1 and requires the vehicle 1 to stop and when the road surface has a relatively low coefficient of friction (in the case of a so-called low μ road), if a distance from the assistance end position of the deceleration assistance control to a stop position defined by the deceleration target (e.g., a stop line position) is relatively short, then, the driver likely steps on the brake pedal relatively strongly, and as a result, it may increase a possibility of the vehicle 1 to slip. Alternatively, even if the distance from the assistance end position of the deceleration assistance control to the stop position defined by the deceleration target (e.g., a stop line position) is relatively long, if the speed of the vehicle 1 is relatively high at an end point of the deceleration assistance control, then, the driver likely steps on the brake pedal relatively strongly, and as a result, it may increase a possibility of the vehicle 1 to slip. If the end condition is set in the above manner, it is possible to prevent the vehicle 1 from slipping due to the driver's brake operation after the end of the deceleration assistance control.

Figure 4:
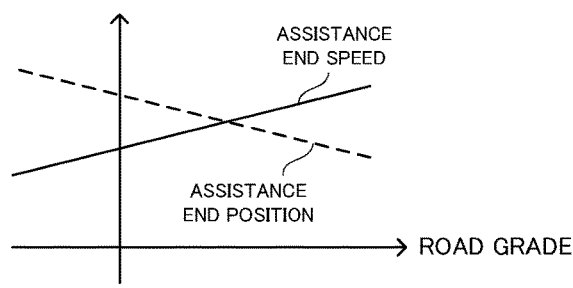
FIG. 4 is a graph illustrating an example of a relation among a road grade, an assistance end speed, and an assistance end position.

For example, when the deceleration target is something that does not collide with the vehicle 1 (wherein the deceleration target may be something that requires the vehicle 1 to stop, or may be something that requires the vehicle 1 to decelerate) and when the degree of upgrade of a road, on which the vehicle 1 travels, is high, the assistance amount arithmetic device 14 sets (or changes) the end condition of the deceleration assistance control so as to reduce the distance from the assistance end position to the deceleration target, and/or so as to increase the assistance end speed, in comparison with those when the degree of upgrade of the road is low (refer to FIG. 4).

Alternatively, when the deceleration target is something that does not collide with the vehicle 1 (wherein the deceleration target is typically something that requires the vehicle 1 to stop) and when the degree of down grade of a road, on which the vehicle 1 travels, is high, the assistance amount arithmetic device 14 sets (or changes) the end condition of the deceleration assistance control so as to increase the distance from the assistance end position to the deceleration target, and/or so as to reduce the assistance end speed, in comparison with those when the degree of down grade of the road is low (refer to FIG. 4).

By virtue of such a configuration, it is possible to realize the deceleration assistance control that takes into account an influence of gravity acting on the vehicle 1 on the grade.

Various aspects of embodiments of the present disclosure derived from the embodiments and modified example explained above will be explained hereinafter.

A driving assistance apparatus according to an aspect of embodiments of the present disclosure is a driving assistance apparatus configured to be able to perform deceleration assistance of decelerating a host vehicle independently of an operation by a driver, the driving assistance apparatus provided with: a specifier configured to specify a type of a target associated with the deceleration assistance, wherein the target is ahead of the host vehicle on a course thereof and requires the host vehicle to decelerate or stop; and a controller programmed to change an end condition associated with deceleration assistance, in accordance with the specified type. In the aforementioned embodiment, the external information recognition device 11 corresponds to an example of the specifier, and the assistance amount arithmetic device 14 corresponds to an example of the controller. The "deceleration target" according to the aforementioned embodiment corresponds to an example of the "target".

The "target associated with the deceleration assistance", as described above, requires the host vehicle to decelerate or stop. Specifically, an example includes: an obstacle, such as, for example, another vehicle, a pedestrian, and a structure; something that restricts travel of the vehicle 1, such as, for example, a road sign, a red light, and a stop line; and a road structure, such as, for example, an intersection and a curve.

When the target is, for example, an obstacle, it is desirable that the deceleration assistance is provided until the host vehicle completely stops. On the other hand, when the target is, for example, a stop line, the stop position of the host vehicle may vary depending on the driver. In this case, if the deceleration assistance is provided until the host vehicle completely stops, the driver, who feels discomfort for the stop position of the host vehicle due to the deceleration assistance, may change the stop position of the host vehicle. In other words, if the deceleration assistance is uniformly provided regardless of the target, the driver may feel discomfort.

On the driving assistance apparatus, however, the end condition associated with the deceleration assistance is changed in accordance with the type of the target associated with the deceleration assistance, by the controller. Thus, on the driving assistance apparatus, it is possible to perform the deceleration assistance until the host vehicle completely stops, or to end the deceleration assistance before the host vehicle completely stops, depending on the target. Therefore, according to the driving assistance apparatus, it is possible to appropriately provide the deceleration assistance while preventing the driver's discomfort.

Here, the type includes (i) something that possibly collides with the host vehicle, (ii) something that does not collide with the host vehicle and requires the host vehicle to stop, and (iii) something that does not collide with the host vehicle and requires the host vehicle to decelerate, and the end condition includes an assistance end position, which is a position at which the deceleration assistance is ended, and an assistance end speed, which is a target speed at the assistance end position.

In an aspect of the driving assistance apparatus, the controller may be programmed to set the assistance end position to a position that is away from the target by a predetermined distance on a current position side of the host vehicle, and may be programmed to set the assistance end speed to zero, when the specified type is something that possibly collides with the host vehicle.

According to this aspect, it is possible to stop the host vehicle while avoiding a collision between the host vehicle and the target. The "predetermined distance" may be set in such a manner that a distance between the host vehicle and the target when the host vehicle stops does not cause the driver to fear.

In another aspect of the driving assistance apparatus, the controller may be programmed to set the assistance end position on the basis of a position relation between the target and a stop position defined by the target, and may be programmed to set the assistance end speed to a value that is greater than zero, when the specified type is something that does not collide with the host vehicle and something that requires the host vehicle to stop.

In this case, since the assistance end speed is greater than zero, the host vehicle does not completely stop when the deceleration assistance is ended. In other words, in this aspect, so as to completely stop the host vehicle, it is necessary for the driver to operate the host vehicle (specifically, to step on the brake pedal) after the end of the deceleration assistance. It is, however, possible for the driver to determine the stop position of the host vehicle because the driver can operate the host vehicle after the end of the deceleration assistance. Thus, according to this aspect, it is possible to prevent the drive's discomfort caused by the deceleration assistance.

In another aspect of the driving assistance apparatus, the controller may be programmed to set at least one of the assistance end position and the assistance end speed, on the basis of a road surface condition, when the specified type is (i) something that does not collide with the host vehicle and requires the host vehicle to stop or (ii) something that does not collide with the host vehicle and requires the host vehicle to decelerate.

Here, the "road surface condition" may conceptually include not only a condition that may influence a coefficient of friction of a road surface, such as, for example, a degree of unevenness of the road surface, a degree of wetting of the road surface, the presence/absence of an icy road condition, and the presence/absence of snow coverage, but also a road grade or the like.

A change in the road surface condition may change ease of decelerating or stopping the host vehicle. If at least one of the assistance end position and the assistance end speed is set on the basis of the road surface condition, then, when the driver decelerates or stops the host vehicle after the end of the deceleration assistance, it is expected that the host vehicle is decelerated or stopped the way driver imagines.

In this aspect, the controller is programmed to perform at least one of setting the assistance end position to a position that is close to the target and increasing the assistance end speed if a degree of upgrade as the road surface condition is high, in comparison with those if the degree of upgrade is low, when the specified type is (i) something that does not collide with the host vehicle and requires the host vehicle to stop or (ii) something that does not collide with the host vehicle and requires the host vehicle to decelerate. By virtue of such a configuration, it is possible to provide the deceleration assistance that takes into account an influence of gravity acting on the host vehicle on the upgrade (i.e., an influence of gravity acting the host vehicle as a retarding force or deceleration force).

Alternatively, in this aspect, the controller is programmed to perform at least one of setting the assistance end position to a position that is far from the target and reducing the assistance end speed if degree of down grade as the road surface condition is high, in comparison with those if the degree of down grade is low, when the specified type is something that does not collide with the host vehicle and requires the host vehicle to stop. By virtue of such a configuration, it is possible to provide the deceleration assistance that takes into account an influence of gravity acting on the host vehicle on the down grade (i.e., an influence of gravity acting the host vehicle as an acceleration force).

Alternatively, in this aspect, the controller is programmed to perform at least one of setting the assistance end position to a position that is far from the target and reducing the assistance end speed if a coefficient of friction of a road surface as the road surface condition is low, in comparison with those if the coefficient of friction of the road surface is high, when the specified type is something that does not collide with the host vehicle and requires the host vehicle to stop. By virtue of such a configuration, it is possible to prevent the host vehicle from slipping due to the driver's brake operation after the end of the deceleration assistance control.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to be able to perform deceleration assistance of decelerating a host vehicle independently of an operation by a driver, said driving assistance apparatus comprising a processor configured to:

specify a type of a target associated with the deceleration assistance, wherein the target is ahead of the host vehicle on a course thereof and requires the host vehicle to decelerate or stop;

determine whether the type is one of (i) something that possibly collides with the host vehicle, (ii) something that does not collide with the host vehicle and requires the host vehicle to stop, and (iii) something that does not collide with the host vehicle and requires the host vehicle to decelerate; and change an end condition associated with the deceleration assistance, in accordance with the specified type of the target, wherein the end condition includes an assistance end position, which is a position at which the deceleration assistance is ended, and an assistance end speed, which is a target speed at the assistance end position; wherein:

upon determination that the type is something that possibly collides with the host vehicle, the assistance end position is set to a position that is away from the target by a predetermined distance, and the assistance end speed is set to zero;

upon determination that the type is something that does not collide with the host vehicle and requires the host vehicle to stop, the assistance end position is set on the basis of a position relation between the target and a stop position defined by the target, and the assistance end speed is set to a value greater than zero; and upon determination that the type is something that does not collide with the host vehicle and requires the host vehicle to decelerate, the assistance end position is set on the basis of a position relation between the target and a stop position defined by the target, and the assistance end speed is set to a value corresponding to the target.

2. The driving assistance apparatus according to claim 1, wherein, upon determination that the type is something that does not collide with the host vehicle and requires the host vehicle to stop, or the specified type is something that does not collide with the host vehicle and requires the host vehicle to decelerate, said processor is configured to set at least one of the assistance end position and the assistance end speed, on the basis of a road surface condition.

3. The driving assistance apparatus according to claim 2, wherein, upon determination that the type is something that does not collide with the host vehicle and requires the host vehicle to stop, or the specified type is something that does not collide with the host vehicle and requires the host vehicle to decelerate, said processor is configured to perform at least one of setting the assistance end position to a position that is close to the target and increasing the assistance end speed if a degree of upgrade as the road surface condition is high, in comparison with those if the degree of upgrade is low.

4. The driving assistance apparatus according to claim 2, wherein, upon determination that the type is something that does not collide with the host vehicle and requires the host vehicle to stop, said processor is configured to perform at least one of setting the assistance end position to a position that is far from the target and reducing the assistance end speed if degree of down grade as the road surface condition is high, in comparison with those if the degree of down grade is low.

5. The driving assistance apparatus according to claim 2, wherein, upon determination that the type is something that does not collide with the host vehicle and requires the host vehicle to stop, said processor is configured to perform at least one of setting the assistance end position to a position that is far from the target and reducing the assistance end speed if a coefficient of friction of a road surface as the road surface condition is low, in comparison with those if the coefficient of friction of the road surface is high.

* * * * *